(12) United States Patent
Chien et al.

(10) Patent No.: US 8,131,653 B2
(45) Date of Patent: Mar. 6, 2012

(54) METHOD AND APPARATUS FOR WARRANTY COST CALCULATION

(75) Inventors: Ying-Che Chien, Holmdel, NJ (US); Niren Cc Choudhury, Bridgewater, NJ (US); Paul Hampton Franklin, Colts Neck, NJ (US); Shirish N. Kher, Plainsboro, NJ (US); Holly-Dee Rubin, West Trenton, NJ (US); Paul A. Remick, Hazlet, NJ (US); Philip L. Scarff, Winchester, MA (US); Hongzhou Wang, Bridgewater, NJ (US)

(73) Assignee: Alcatel Lucent, Paris (FR)

( * ) Notice: Subject to any disclaimer, the term of this patent is extended or adjusted under 35 U.S.C. 154(b) by 1064 days.

(21) Appl. No.: 10/954,678

(22) Filed: Sep. 30, 2004

(65) Prior Publication Data

US 2006/0069581 A1    Mar. 30, 2006

(51) Int. Cl.
*G06Q 99/00*    (2006.01)
(52) U.S. Cl. ............. 705/400; 705/1.1; 705/4; 705/302; 703/6
(58) Field of Classification Search ................ 705/1, 35, 705/400, 4, 1.1, 7.14, 302; 703/6; 340/438
See application file for complete search history.

(56) References Cited

U.S. PATENT DOCUMENTS

| 5,608,658 | A  | * | 3/1997 | Yao et al. ...................... 702/108 |
| 5,737,581 | A  | * | 4/1998 | Keane ............................... 703/6 |
| 6,182,048 | B1 | * | 1/2001 | Osborn et al. .................... 705/4 |
| 6,366,199 | B1 | * | 4/2002 | Osborn et al. ................. 340/438 |
| 6,993,457 | B2 | * | 1/2006 | Zajac et al. .................... 702/185 |
| 7,912,772 | B2 | * | 3/2011 | Whear et al. .................... 705/35 |
| 2002/0026395 | A1 | * | 2/2002 | Peterson .......................... 705/35 |
| 2003/0033170 | A1 | * | 2/2003 | Bhatt et al. ........................ 705/4 |
| 2003/0033260 | A1 | * | 2/2003 | Yashiro et al. ................ 705/400 |
| 2003/0115158 | A1 | * | 6/2003 | Richardson .................... 705/400 |
| 2003/0149548 | A1 | * | 8/2003 | Mosses et al. ................ 702/184 |

(Continued)

FOREIGN PATENT DOCUMENTS

EP    1049314 A1 * 11/2000

OTHER PUBLICATIONS

Polatoglu et al. "Probability distribution of cost, revenue, and profit over a warranty cycle", 1998, European Journal of Operational Research, pp. 170-183.*

(Continued)

*Primary Examiner* — Igor Borissov
*Assistant Examiner* — Freda A Nelson
(74) *Attorney, Agent, or Firm* — Wall & Tong, LLP

(57) ABSTRACT

Method and apparatus for calculating warranty cost includes determining values for a plurality of parameters that characterize a corresponding plurality of physical conditions of a product that is returned under warranty, determining values for a plurality of variables that characterize a customer profile for the product and evaluating an expression that calculates warranty cost based on said determined parameter and variable values. The plurality of physical conditions of the product includes the conditions of no-trouble-found (NTF), repaired, junked, and subject to further failure mode analysis (FMA). The plurality of parameters further comprises probabilities and costs that correspond to each of the physical conditions. Evaluating the above expression includes evaluating a first expression that calculates repair, product conformance and Dead-On-Arrival cost and evaluating a second expression that calculates Change Notice cost. Subsequently, the two costs are summed to arrive at the total warranty cost.

14 Claims, 5 Drawing Sheets

U.S. PATENT DOCUMENTS

2004/0030574 A1* 2/2004 DiCostanzo et al. ............. 705/1
2004/0138908 A1* 7/2004 Lowe et al. .................... 705/1.1
2005/0015273 A1* 1/2005 Iyer .................... 705/1

OTHER PUBLICATIONS

"Entigo Introduces Industry's First B2B Warranty Claims Management e-Commerce Application", Dec 18, 2000, Business Wire, p. 2297 (5 pgs).*

Fahy, James P., "Estimating Warranty and Service Costs From MTBF Estimates", Apr. 1995, IEEE, Data General Corporation, pp. 35-47.*
Frees et al., "Approximating Expected Warranty Costs", Dec. 1988, Management Science, 34, 12, pp. 1441-1449.*
Chun et al., "Determining the Optimal Warranty Price Based on the Producer's and Customers' Risk Preferences", Apr. 1993, pp. 97-110.*

* cited by examiner

METHOD AND APPARATUS FOR WARRANTY COST CALCULATION

FIELD OF INVENTION

The invention relates to the field of business cost analysis and, more specifically, to the estimation of warranty costs associated with a particular product.

BACKGROUND OF INVENTION

A warranty cost model is a business tool that is used by a manufacturer of goods to predict the total expense associated with a given product resulting from warranty claims. Typically, warranty cost is expressed as a percentage of sales in dollars of a given product. The associated models are relatively simple in the amount of variables that are analyzed to arrive at the total expected warranty cost. For example, if there are an anticipated $2 billion in sales of Product X, $40 million or roughly 2% of sales is allocated for warranty expenses related to Product X. However, during times of general economic downturn, lower than expected sales may not be sufficient to cover actual incurred warranty expenses. Thus, a single parameter based solely on expected sales of a product is insufficient to conduct accurate warranty cost modeling. Current warranty cost models are further limited in that they estimate warranty costs during a particular financial period without considering warranty claims of products sold (i.e., installed at a customer facility or otherwise "in the field") during a previous financial period.

SUMMARY OF THE INVENTION

Accordingly, we have recognized that there is a need to accurately predict warranty costs by parameters other than anticipated sales and over varying time periods, if necessary, to provide sufficient reserves to cover warranty costs. To this end, we have developed a novel method and apparatus for calculating warranty cost of a product according to parameters that characterize physical conditions of a product that is returned under warranty and a set of variables that characterize a customer profile for the product. These physical condition parameters and customer profile variables are employed to evaluate an expression that calculates warranty cost.

More specifically, the possible physical conditions of the returned product, which may also be considered as physical dispositions of units of the product, include the conditions of no-trouble-found (NTF), repaired, junked, and subject to further failure mode analysis (FMA). The parameters provide probabilities and costs that correspond to each of the physical conditions or dispositions for a unit that is returned under warranty. In one example, the probabilities are determined from data contained within a quality monitoring system associated with the product and the costs are determined from data contained within an accounting system associated with the product. Variables that characterize a customer profile for the product include the number of units of the product under warranty, warranty duration, trial period before the warranty period and other factors depending on how the warranty cost model is to be evaluated.

Evaluating the expression that calculates warranty cost based on the determined parameter and variable values includes evaluating a first expression that calculates repair, product conformance and Dead-On-Arrival cost and evaluating a second expression that calculates Change Notice cost. Subsequently, the two costs are summed to arrive at the total warranty cost. Accordingly, the method and apparatus can calculate warranty cost according to data that characterizes the physical condition of a product which provides a more accurate figure than warranty cost based on estimated sales. This utility is especially effective is relatively lower economic activity periods.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The subject invention presents the concept that warranty cost may be affected by many physical factors of the equipment including but not limited to failure rates, infant mortality, burn-in, dead on arrivals (DOAs), no trouble founds (NTFs), sparing levels, field reliability, use environments, change notices and warranty durations. In consideration of these factors, a comprehensive warranty cost model and cost estimation and calculation method has been developed. This warranty cost model is described in greater detail with respect to the figures and following description using telecommunication equipment as the model product under warranty cost evaluation. However, the invention is useful for evaluating any type of product for any type of business that will benefit from an analysis of physical factors of units in the field rather than projected number of units of the product that are sold.

Figure 2:
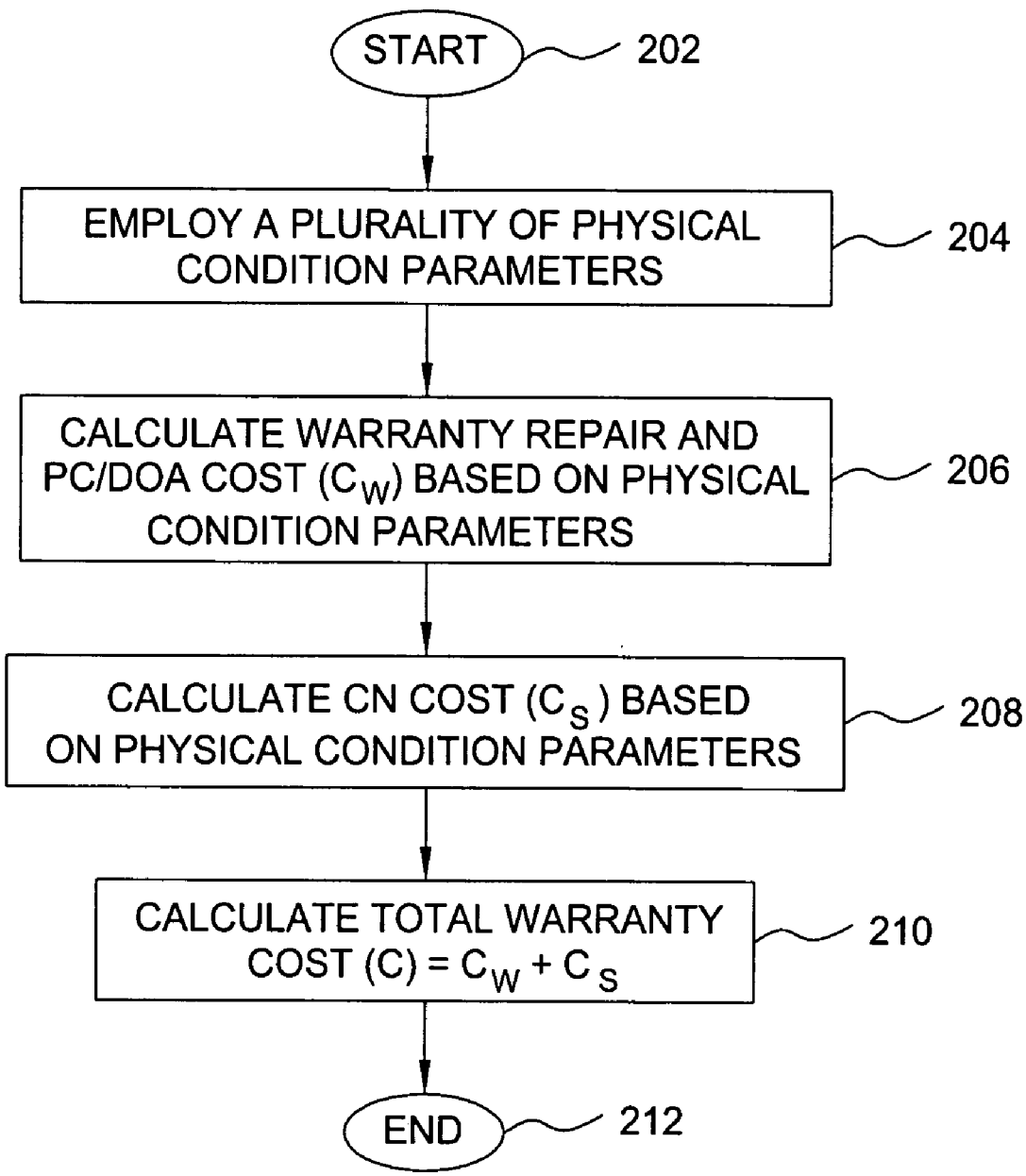
FIG. 2 depicts a series of method steps of the basic warranty cost calculation of the subject invention.

FIG. 2 depicts a series of method steps 200 that generally describe the method of the subject invention. In a broad aspect of the invention, a series of physical condition parameters which denote certain physical states or dispositions of the item for which the warranty cost modeling is being conducted are employed in a series of calculations to arrive at the total warranty cost for the item. Specifically, the method starts at step 202 and proceeds to step 204 where the employed plurality of physical condition parameters are received and entered into the series of calculations. A detailed description of each of the parameters is described in greater detail below.

Once values for the employed plurality of physical condition parameters have been received and entered, the method proceeds to step 206 where a first type of warranty calculation is formed. More specifically, a warranty repair and product conformance (PC/DOA) cost ($C_W$) is calculated based on the determined values of the plurality of physical condition parameters. At step 208, a second type of warranty calculation is performed. Specifically, a change notice (CN) cost ($C_S$) is calculated based on the above-determined values of the plurality of physical condition parameters. At step 210, the total warranty cost (C) is calculated based on the previously calculated values from the first calculation step 206 and the second calculation step 208. That is, total warranty cost C equals $C_W$ plus $C_S$. Although the method described calculates $C_W$ first and $C_S$ second, this is not a specific, limiting order. That is, calculation of these values is interchangeable with no effect on the overall invention. The method ends at step 212.

Figure 3:
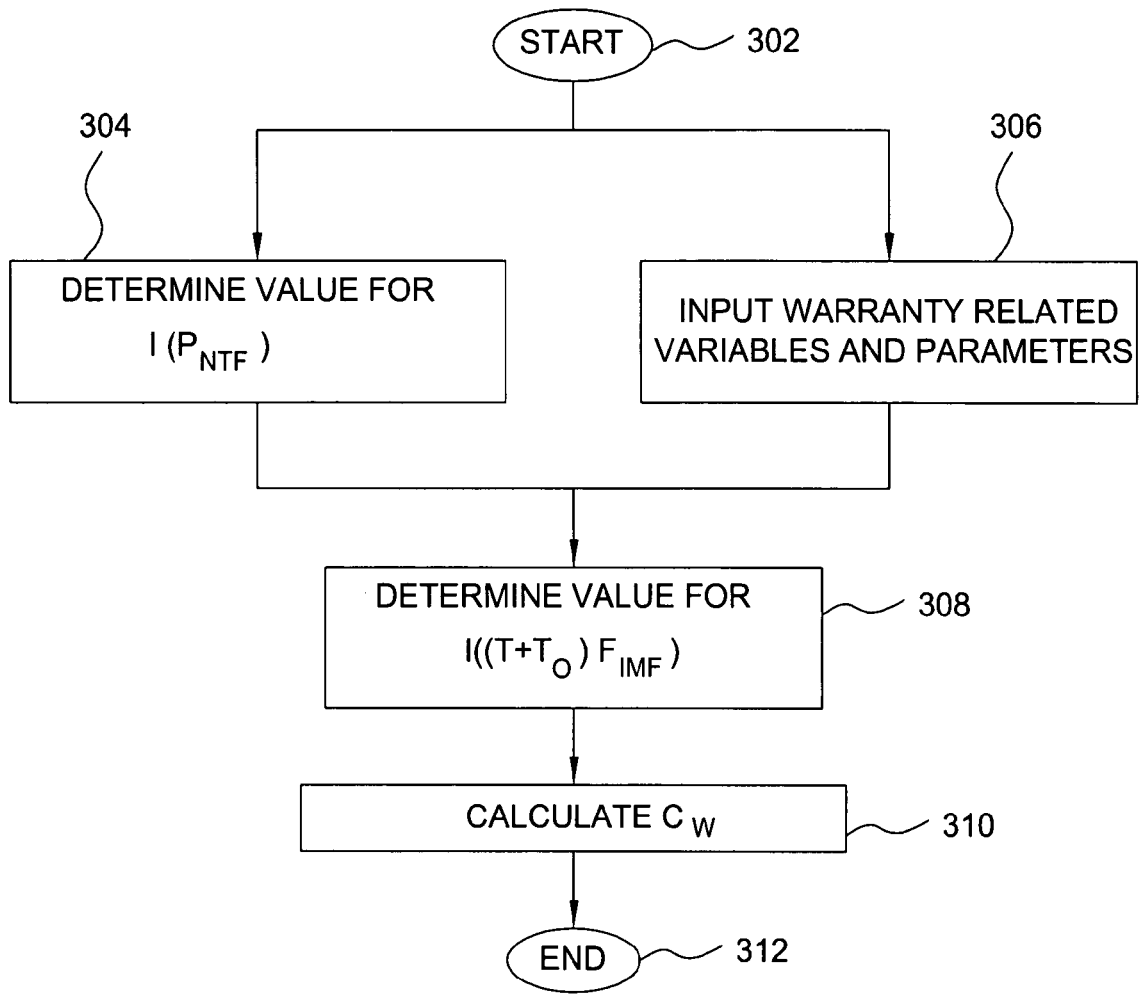
FIG. 3 depicts a detailed series of method steps of a first part of the basic warranty cost calculation of the subject invention.

FIG. 3 depicts a series of method steps 300 that further details step 206 of FIG. 2. That is, a step of calculating $C_W$ includes the following substeps. Specifically, the method of step 206 starts at step 302 and proceeds to steps 304 and 306. At step 304, a determination of a value for a no-trouble-found (NTF) indicator function I ($P_{NTF}$) is determined. The NTF indicator function reflects the policy and/or contract provisions governing the treatment of a customer for whom the model is being evaluated. If the customer pays for processing NTF circuit packs, then I($P_{NTF}$)=0. In other words, NTF circuit packs are excluded from the model. If a supplier pays for processing of the NTF circuit packs, the I($P_{NTF}$) =$P_{NTF}$ (the value of the probability that a returned circuit pack is an NTF circuit pack). At step 306, employed variables related to the warranty period (and other similar variables) are collected and input into the basic warranty repair cost ($C_W$) equation and IMF indicator function (described in greater detail below). The variables include:

n number of circuit packs or units under warranty considerations
T Warranty duration or warranty period length (years)
$T_0$ Trial period length before the warranty period starts (years)
$\tau_L$ warranty starting time with warranty period [$\tau_L, \tau_U$]
$\tau_U$ warranty ending time with warranty period [$\tau_L, \tau_U$]
β distribution factor Note that steps 304 and 306 have been shown in parallel format in FIG. 3 as their specific order with respect to one another has no effect on the overall results. Accordingly, any arrangement of steps 304 and 306 are acceptable for the subject calculations so long as they occur before all other subsequent steps.

After steps 304 and 306, the method proceeds to step 308 where a determination of a value for an IMF indicator function (I(T+$T_0$)·$F_{IMF}$) is made. The IMF indicator function performs the role of determining how the cost of a product that is shipped to a customer's location, but never installed by that customer, is to be included in the model. Examples of products (circuit packs) that are shipped but never installed are over-shipped items, sales returns, products damaged during transit, duplications and installation failures (DOA).

One of the specific advantages of the subject invention is its ability to prepare estimates based on different time intervals for warranty periods. This is shown in one aspect of the invention through the IMF indicator function. For example and in a first embodiment of the IMF indicator function, a basic case is considered where there are n circuit packs under warranty and all circuit packs have the same warranty length of T years and a trial period of $T_0$ years and are operating during the time frame (T+$T_0$) (i.e., there are no spares in storage). In such a first case, $$I((T+T_0) \cdot F_{IMF}) = \qquad (1)$$

$$\begin{cases} (T+T_0) \cdot F_{IMF} + (D-1) \cdot F_{IMF} & \forall\ 0 < T+T_0 \leq 1 \\ D \cdot F_{IMF} + T + T_0 - 1 & \forall\ T+T_0 \geq 1 \text{ years} \end{cases}$$

D≧1 and is designed to adjust for the part of $C_W$ cost excluding random failure cost in period $T_0$, if any, and not to adjust for random failure cost in period $T_0$. In principle, $C_W$ cost should include it if $T_0$>0 (note $C_W$ cost covers costs associated from the time the product is shipped to the time that the customer fully accepts the product). The default value for D is 1. $F_{IMF}$ is identified as an Infant Mortality Factor and is described in greater detail below.

In a second case of the IMF indicator function, there are n circuit packs with warranty time starting at 0, all having the same warranty length of T years in the trial period length of $T_0$ years. The total warranty cost for the n circuit packs incurred for a future time interval defined by [$\tau_L, \tau_U$] can be approximated as follows:

$$I((T+T_0) \cdot F_{IMF}) = \qquad (2)$$

$$\begin{cases} 0 & \forall\ T+T_0 \leq \tau_L \\ T+T_0 - \tau_L + (D-1) \cdot F_{IMF} & \forall\ \tau_L < T+T_0 \leq \tau_U,\ \tau_L \geq 1 \\ (D-\tau_L) \cdot F_{IMF} + (T+T_0-1) & \forall\ \tau_L < T+T_0 \leq \tau_U,\ 0 \leq \tau_L < 1 \\ \tau_U - \tau_L + (D-1) \cdot F_{IMF} & \forall\ T+T_0 \geq \tau_U,\ \tau_L \geq 1 \\ (D-\tau_L) \cdot F_{IMF} + \tau_U - 1 & \forall\ T+T_0 \geq \tau_U,\ 0 \leq \tau_L < 1 \end{cases}$$

If $\tau_L$=0 and T+$T_0$=$\tau_U$, than equation 2 reduces to 1. Generally, D=1 in formula 2 except when $\tau_L$=0.

In a third case, assume that there are n circuit packs with warranty times starting over a period of time [0, $T_\beta$] (years) and they all have the same warranty length of T years and trial period length of $T_0$ years. The total warranty cost for these n circuit packs incurred for a future time interval [$\tau_L, \tau_U$] can be approximated by formulae (2) and (3), given time starts from zero, time units are in years and warranty duration T+$T_0$≧1 and T+$T_0$≧$T_\beta$, where $$I((T+T_0) \cdot F_{IMF}) = \tag{3}$$

$$\begin{cases} 0 & \forall\ T+T_0+\frac{1}{2}\beta \cdot T_\beta \leq \tau_L \\[6pt] T+T_0+\frac{1}{2}\beta \cdot T_\beta - \tau_L & \begin{array}{l} \forall\ \tau_L < T+T_0+\frac{1}{2}\beta \cdot T_\beta \leq \tau_U, \\ \tau_L \geq 1 + \frac{1}{2}\beta \cdot T_\beta \end{array} \\[10pt] \left(1+\frac{1}{2}\beta \cdot T_\beta - \tau_L\right)\cdot F_{IMF} + (T+T_0-1) & \begin{array}{l} \forall\ \tau_L < T+T_0+\frac{1}{2}\beta \cdot T_\beta \leq \tau_U, \\ \frac{1}{2}\beta \cdot T_\beta \leq \tau_L < 1+\frac{1}{2}\beta \cdot T_\beta \end{array} \\[10pt] \tau_U - \tau_L & \begin{array}{l} \forall\ T+T_0+\frac{1}{2}\beta \cdot T_\beta \geq \tau_U, \\ \tau_L \geq 1+\frac{1}{2}\beta \cdot T_\beta \end{array} \\[10pt] \left(1-\tau_L+\frac{1}{2}\beta \cdot T_\beta\right)\cdot F_{IMF} + \tau_U - 1 - \frac{1}{2}\beta \cdot T_\beta & \begin{array}{l} \forall\ T+T_0+\frac{1}{2}\beta \cdot T_\beta \geq \tau_U, \\ \frac{1}{2}\beta \cdot T_\beta \leq \tau_L < 1+\frac{1}{2}\beta \cdot T_\beta \end{array} \\[10pt] F_{IMF} + T+T_0 - 1 & \begin{array}{l} \forall\ T+T_0+\frac{1}{2}\beta \cdot T_\beta \leq \tau_U, \\ \frac{1}{2}\beta \cdot T_\beta > \tau_L \geq 0 \end{array} \end{cases}$$

Specifically, the distribution factor $0 \leq \beta \leq 2$ has a default of value of 1, which is reached when all warranty-effective dates are uniformly distributed over period $T_\beta$. $\beta$ is 0 when warranty times of all packs start at $T_\beta$ and is 2 when all packs have warranty times starting at time 0.

Once the appropriate case for the IMF indicator function is considered and the appropriate value determined, the method 300 proceeds to step 310 where the actual calculation of the warranty repair and PC/DOA cost $C_w$ is performed. Specifically, the total warranty cost for a number n of units (i.e., circuit packs) with warranty period length T years and trial period length of $T_0$ years is given by:

$$C_w(T+T_0) \approx n \cdot \frac{8.76 \times 10^{-10} \lambda \cdot I((T+T_0) \cdot F_{IMF})}{P_{repair} + P_{junk} + P_{FMA}} \cdot \tag{4}$$

$$\{I(P_{NTF}) \cdot C_{NTF} + P_{repair} \cdot C_{repair} + P_{junk} \cdot C_{junk} + P_{FMA} \cdot C_{FMA}\}$$

In this equation, $8.76 \times 10^{-6}$ is a constant that represents the number of failures (or returned units) in one year. Once $C_w$ is calculated, the method ends at step 312.

$C_{NTF}$, $C_{repair}$, $C_{junk}$, and $C_{FMA}$ are physical disposition parameters that represent the expected costs for a returned unit (i.e., circuit pack) that is indicated as no-trouble-found (NTF), repaired, junked, or subject to further failure mode analysis (FMA), respectively. Each of these costs includes a common cost element $C_L$ to account for logistics, special shipping, duties, taxes, storage/carrying cost, installation/de-installation cost and the like. Accordingly, $C_{NTF} = C'_{NTF} + C_L$ $C_{repair} = C'_{repair} + C_L$ $C_{junk} = C_{COGS} + C_L + C_M$ $C_{FMA} = C'_{FMA} + C_L$ where $C'_{NTF}$, $C'_{repair}$, and $C'_{FMA}$ are pure NTF cost, repair cost, and FMA cost respectively. $C_M$ is the junk processing cost and $C_{COGS}$ is the cost of goods sold. $C_L$ for customers in some countries could be as high as hundreds of US dollars. Typically, the repair cost is no more than the junk cost, though may vary dramatically in some instances.

$P_{NTF}$, $P_{repair}$, $P_{junk}$, and $P_{FMA}$ are the physical disposition parameters that represent the expected probabilities that a returned unit (i.e., circuit pack) is indicated as no-trouble-found (NTF), repaired, junked, or subject to further failure mode analysis (FMA), respectively. Note that $P_{NTF} + P_{repair} + P_{junk} + P_{FMA} = 1$.

Values for these employed cost and probability parameters are broken down into the four major categories (or physical dispositions) that the unit may fall under. As such, warranty costs can be estimated and calculated based on what may actually happen to the unit rather than the projected number of units of product sold. The parameters are estimated by using known cost accounting and quality engineering principles and specific data associated with the product. In one embodiment of the invention, costs are determined from a business's cost accounting system. In general, businesses conducting operations in according with GAAP may be expected to routinely produce standard and/or custom cost reports with any needed information. Similarly, in one embodiment of the invention, probabilities are determined from a business's quality system. One skilled in the art will understand that the specific data records and mathematical manipulation of those data records are outside the scope of the invention; however, generally, businesses conducting operations in accordance with TL-9000, ISO-9000, or other generally accepted quality management system may be expected to routinely produce standard reports that characterize returned product in a manner suitable for use in the subject invention.

Figure 1:
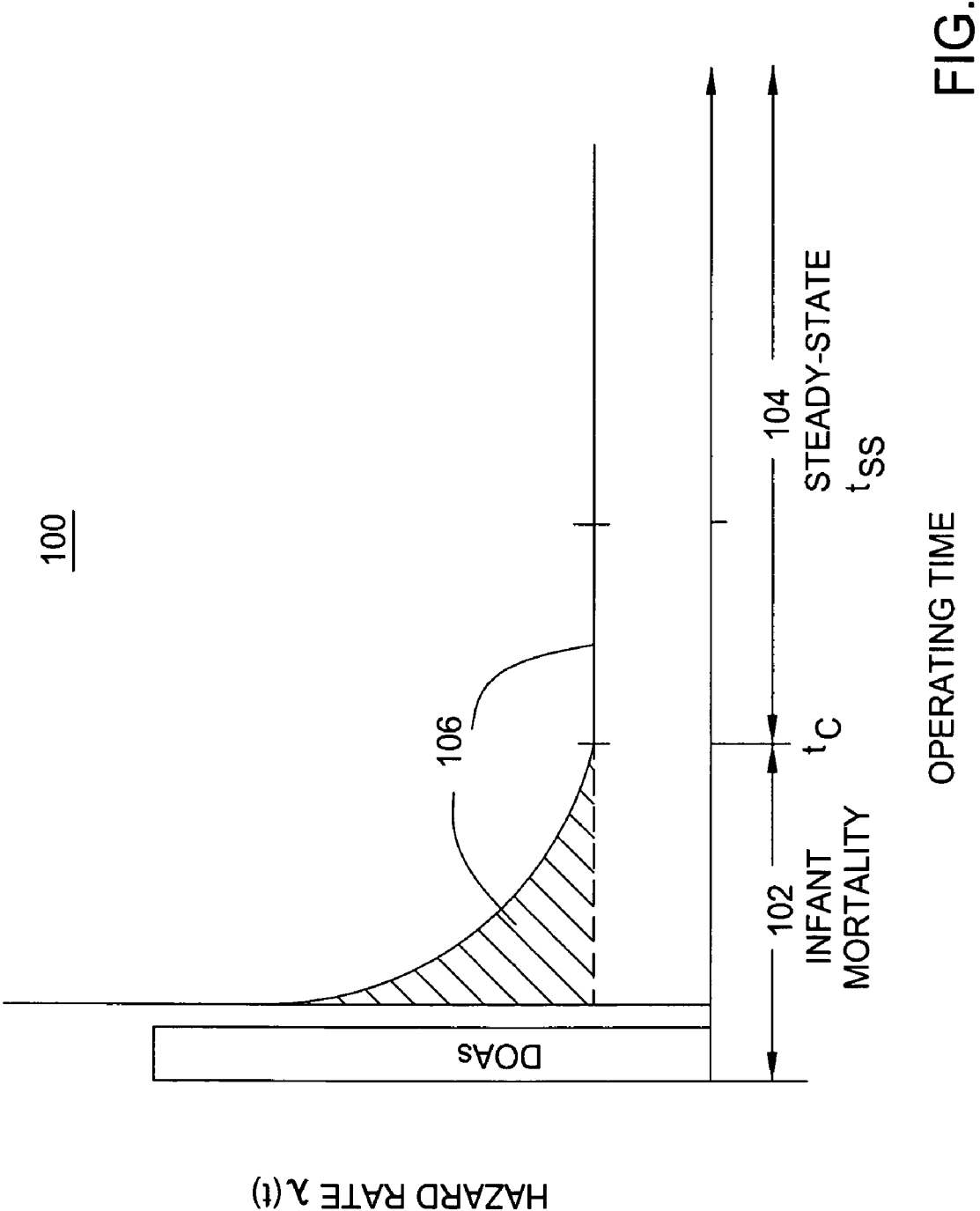
FIG. 1 depicts a graph of hazard (or failure) rate of a given product vs. time in accordance with the subject invention.

Two variables requiring further description and explanation are $\lambda$ and $F_{IMF}$. Consider that a manufacturer agrees to repair or to provide replacements for failed items (field replaceable units) free of charge up to time T from the inception of the warranty period. The warranty expires at time T. Warranty cost is related to product reliability during the warranty period. A conceptual reliability model is shown in FIG. 1. Specifically, the reliability model is a graph 100 of the hazard (or failure) rate λ(t) of a product as a function of time. From the curve in FIG. 1, one can see the failure rate is higher at the beginning of use. This beginning time period, called Infant Mortality period (or early life period) is denoted by section 102 of the curve and in one embodiment of the invention is about $10^4$ hours or about 14 months. A typical warranty period is 12 months which is within the early life period; therefore, this typical warranty period covers the highest-risk period of the product at the manufacturer's cost.

The failure rate model during the early life period is defined by $$\lambda(t) = \lambda_L \left[\frac{t}{t_C}\right]^{-\alpha} \forall\ 0 < t < t_C$$

where $\lambda_L$ is the steady-state or long-term hazard rate, $\alpha(0 \leq \alpha < 1)$ is the exponent characterizing early life reliability, and $t_C$, the crossover time, is 10,000 hours. In the steady state condition (i.e., after 10,000 hours at reference conditions have passed and seen as section 104 of the curve of FIG. 1). The equation reduces to $$\lambda_r(t) = \lambda_L\ \forall t \leq t_C$$

Accordingly, λ in equation 4 is understood to be $\lambda_L$ (the steady state hazard rate).

The ratio of the expected first year failure rate to the steady-state failure rate is identified as the $F_{IMF}$ (Infant Mortality Factor). By viewing curve 100, one understands that the hazard rate λ is time-dependent during the interval of t=0 to t=tc and (relatively) constant during the interval of t=tc to t=tss. Accordingly and for the purposes of the subject invention, an average value of this rate is used in equations 1, 2 and 3 by evaluating the expression $$F_{IMF} = \frac{1}{\lambda_L t_c} \int_0^c \lambda(t) dt$$

This average value represents the shaded region 106 under curve 100. In one embodiment of the invention, $F_{IMF}$ is preferably in the range of approximately 1.4-2.4.

A distinct advantage of incorporating λ into the warranty cost equation is that it (similar to the cost and probability parameters) can provide more realistic estimates of cost based on what physically occurs to the units (i.e., circuit packs) rather than projected sales figures. This aspect is further brought out by the fact that λ can be adjusted to account for different environmental conditions that may exist at different customer locations where such circuit packs are installed. For example and in one embodiment of the invention, if actual use environments are significantly different from the standard reference use environments, the hazard rate of each circuit pack may change. Typical standard reference use of environments include a fixed ground, operating temperature of 40° C., and 25% electrical stress (which may go as high as 50%). Hazard rate adjustment is accomplished by the equation $$\lambda = \lambda_0 \cdot \pi_T \cdot \pi_E \cdot \pi_O$$

where $\lambda_O$ is the hazard rate at the standard reference environments and $\pi_T$ and $\pi_E$ are temperature and environmental factors, respectively. $\pi_O$ is for all the other factors including, but not limited to, contaminations.

Figure 4:
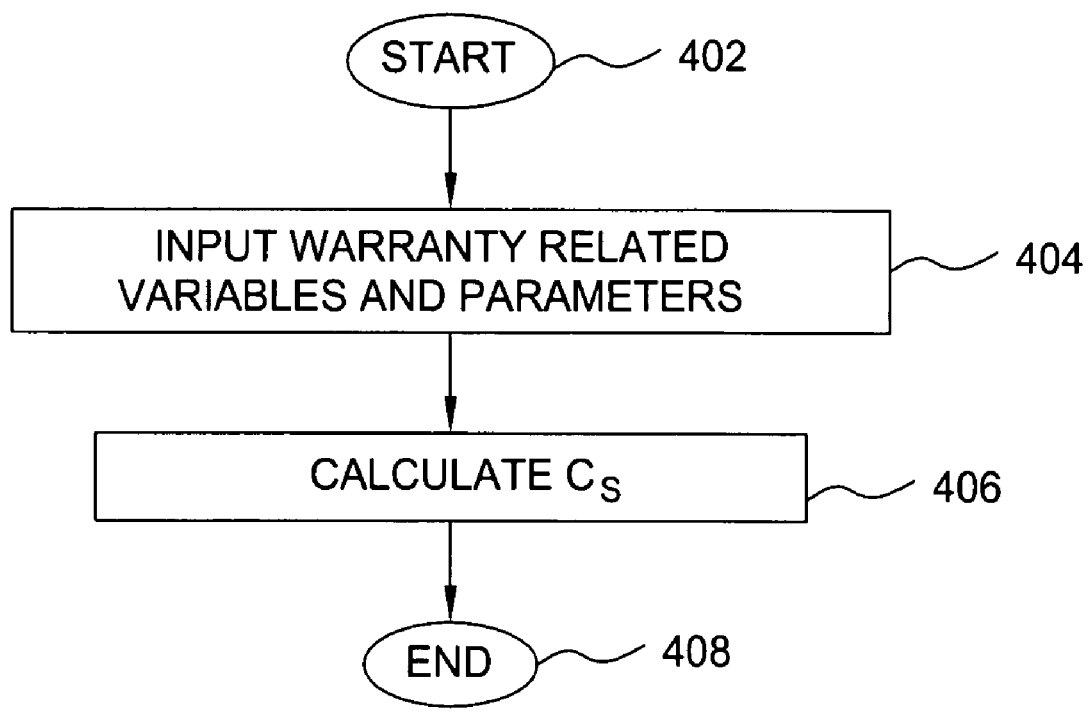
FIG. 4 depicts a detailed series of method steps of a second part of the basic warranty cost calculation of the subject invention.

FIG. 4 depicts a detailed series of method steps 400 that further detail step 208 of FIG. 2. That is, a step of calculating $C_S$ includes the following substeps. Specifically, the method 400 of step 208 starts at step 402 and proceeds to step 404. At step 404, variables related to the warranty period (and other similar variables) are collected and input into the basic change notice cost ($C_S$) equation (described in greater detail below). The variables are (where applicable) the same as those used when calculating $C_w$.

Assume there are n circuit packs to be considered for warranty cost computing. The total CN/Seed stock cost for some specified time period can be given by $$C_s = n \cdot C_s \cdot P_s \cdot F_s$$

where $C_s$ is the average CN/Seed Stock cost per pack. $P_s$ is the probability that a pack will be subject to CN/Seed Stock in this specified time period, with default value of 0 and $F_s$ is an adjustment factor with default value of 1.

It is recognized that when a unit (i.e., circuit pack) fails and is repaired or junked, the manufacturer may recover some cost from suppliers of the failed parts in that unit if those parts are under warranty from their suppliers. Accordingly and as an additional feature of the invention, there is another physical disposition parameter (i.e., a recovery factor) that can be included in the calculations from repair or junk cost. Similarly, if FMA finds failure of some parts, some cost from suppliers of those parts can be recovered if they are under warranty from their suppliers. The recovery factor from repair cost, junk cost, and FMA cost is denoted by $R_{repair}$, $R_{junk}$, $R_{FMA} \leq 1$ respectively. The total warranty cost for a circuit pack with warranty period length of T years and trial period length of $T_0$ years is then:

$$C_w(L) = N_{return}(L) \cdot \{I(P_{NTF}) \cdot C_{NTF} + P_{repair} \cdot C_{repair} \cdot R_{repair} + P_{junk} \cdot C_{junk} \cdot R_{junk} + P_{FMA} \cdot C_{FMA} \cdot R_{FMA}\}$$

or approximated by $$C_w(T+T_0) \approx n \cdot \frac{8.76 \times 10^{-10} \lambda \cdot I((T+T_0) \cdot F_{IMF})}{P_{repair} + P_{junk} + P_{FMA}} \cdot$$

$$\{I(P_{NTF}) \cdot C_{NTF} + P_{repair} \cdot C_{repair} \cdot R_{repair} + P_{junk} \cdot C_{junk} \cdot R_{junk} + P_{FMA} \cdot C_{FMA} \cdot R_{FMA}\}$$

Figure 5:
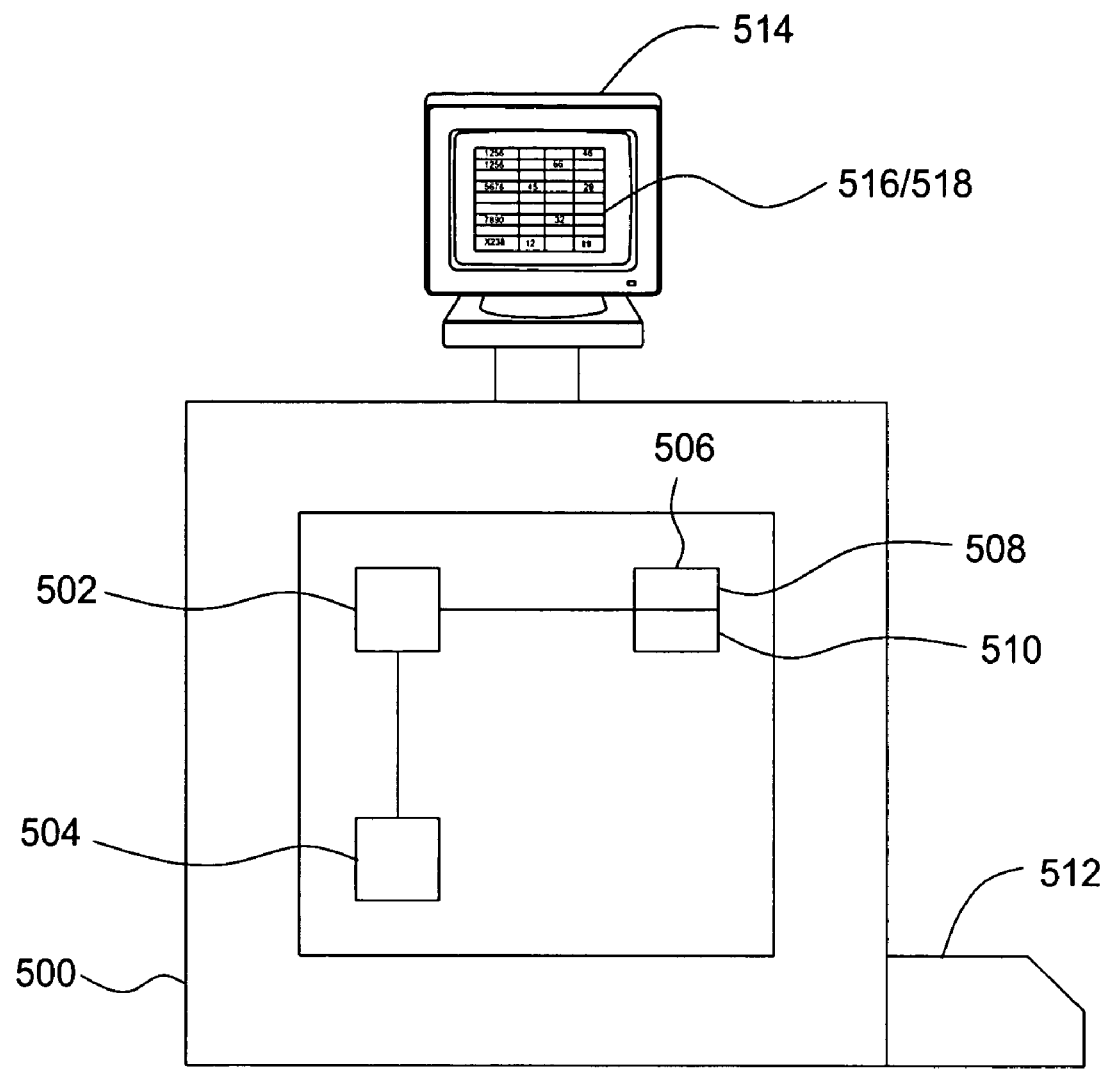
FIG. 5 depicts an apparatus for calculating warranty costs in accordance with the subject invention.

An apparatus in accordance with one embodiment of the subject invention is presented in FIG. 5. Specifically, FIG. 5 depicts a computer 500 (personal computer, networked workstation, network server or the like). The computer 500 includes at least one central processing unit (CPU) 502, support circuits 504, and memory 506. The CPU 502 may comprise one or more conventionally available microprocessors. The support circuits 504 are well known circuits that comprise power supplies, clocks, input/output interface circuitry and the like. Memory 506 comprises various types of computer readable medium including, but not limited to random access memory, read only memory, removable disk memory, flash memory and various combinations of these types of memory. The memory 506 is sometimes referred to as main memory and may in part be used as cache memory or buffer memory. The memory 506 stores various software packages 508-510 that perform operations essential to the computer 500 and/or interconnected workstations, servers and the like if operating in a network environment. When running a particular software package or program 508-510, the computer 500 becomes a special purpose machine for calculating warranty costs based on the physical disposition and condition of items under warranty in accordance with the subject invention. More specifically, the computer 500 becomes a special purpose machine for calculating warranty costs in accordance with methods 200, 300 and 400 described above.

The computer may contain one or more interfaces 512 selected from the group consisting of a keyboard, mouse, touch screen, keypad, voice-activated interface for entering data (i.e., the aforementioned parameters and variables) into an input template 516 displayed on a display device 514. Upon completion of the warranty cost calculations in accordance with method 300 (for warranty repair and PC/DOA cost ($C_w$), an output template 518 showing the results of the calculations is displayed on display device 514. Examples of possible output templates are shown in Tables 1 and 2. One skilled in the art realizes that similar input and output templates are also within the scope of the invention for Change Notice (Cn) cost and total cost (C) as a matter of preferred design and specific desired data output. For example and in one embodiment of the invention, a Microsoft Excel template having the calculations performed by method(s) 200, 300 and or 400 is shown on the display device 514. The required information is input into the template and the results calculated and displayed in a manner typical with Microsoft Excel.

TABLE 1

Warranty cost for FY03
(warranty Term = 5 year)

| Source | Warranty Cost ($M) |
|---|---|
| From FY03 Shipment | $ 0.33553 |
| From FY02 Installed Bases | $ 0.30718 |
| From FY01 Installed Bases | $ 0.12491 |
| From FY00 Installed Bases | $ 0.20117 |
| From FY99 Installed Bases | $ 0.28075 |
| From FY98 Installed Bases | $ 0.17754 |
| FY 03 Total Warranty Cost Estimates | $ 1.4271 |
| FY03 Warranty Cost Target | $ 1.60 |
| FY03 Revenue | $114.50 |
| 1Q03 Warranty Cost Actual | $ 0.35 |

TABLE 2

Warranty cost from FY03 Shipment
(warranty Term = 5 year)

| Item | Warranty Cost ($M) |
|---|---|
| Warranty Cost from FY03 shipment over entire warranty term | 2.07863 |
| NTF Warranty Cost from FY03 shipment over entire warranty term | 0.10328 |
| Repair Warranty Cost from FY03 shipment over entire warranty term | 1.60352 |
| Junk Warranty Cost from FY03 shipment over entire warranty term | 0.08113 |
| FMA Warranty Cost from FY03 shipment over entire warranty term | 0.29070 |

The following four scenarios demonstrate the flexibility of the invention in adapting to different types of warranty periods or conditions to provide for more accurate estimation and calculation of warranty cost.

Scenario A—Warranty Period Length=1 Year

Assume there are $n_1$ circuit packs to be installed over Fiscal Year (FY) X and the warranty period T=1 year. Then the warranty cost for FY X incurred from the installations in FY X can be approximated by:

$$C_{w,FYX} \approx n_1 \cdot \frac{4.38 \times 10^{-6} \lambda \cdot F_{IMF}}{P_{repair} + P_{junk} + P_{FMA}}$$
$$\{I(P_{NTF}) \cdot C_{NTF} + P_{repair} \cdot C_{repair} + P_{junk} \cdot C_{junk} + P_{FMA} \cdot C_{FMA}\}$$

regardless of the trial period $T_0$.

Assume there are $n_2$ packs installed over the prior year—Fiscal Year (FY) X−1 and the warranty period T=1 year. Then the warranty cost for FY X incurred from the installations in FY X−1 can be approximated by:

$$C_{w,FYX-1} \approx n_2 \cdot \frac{4.38 \times 10^{-6} \lambda \cdot F_{IMF}}{P_{repair} + P_{junk} + P_{FMA}}$$
$$\{I(P_{NTF}) \cdot C_{NTF} + P_{repair} \cdot C_{repair} + P_{junk} \cdot C_{junk} + P_{FMA} \cdot C_{FMA}\}$$

The total warranty cost for FY X from all sources can be approximated by: $C \approx C_{w,FYX} + C_{w,FYX-1}$. Also note that the constant representing the number of failures per year is half of that in equation (4). The rationale being that those packs installed in the last month of FY X only receive one month's warranty in FY X, but those packs installed in the first month of FY X receive one year's warranty in FY X. Therefore, an average of 6 months (or half the annual rate) is considered.

Scenario B—Warranty Period Length=2 Years

Assume there are $n_1$ packs to be installed over Fiscal Year (FY) X and the warranty period is T=2 years. Then the warranty cost for FY X incurred from the installations in FY X can be approximated by:

$$C_{w,FYX} \approx n_1 \cdot \frac{4.38 \times 10^{-6} \lambda \cdot F_{IMF}}{P_{repair} + P_{junk} + P_{FMA}}$$
$$\{I(P_{NTF}) \cdot C_{NTF} + P_{repair} \cdot C_{repair} + P_{junk} \cdot C_{junk} + P_{FMA} \cdot C_{FMA}\}$$

regardless of the trial period $T_0$.

Assume there are $n_2$ packs installed over the prior year—Fiscal Year (FY) X−1 and the warranty period is T=2 years. Then the warranty cost for FY X incurred from the installations in FY X−1 can be approximated by:

$$C_{w,FYX-1} \approx n_2 \cdot \frac{4.38 \times 10^{-6} \lambda \cdot (F_{IMF} + 1)}{P_{repair} + P_{junk} + P_{FMA}}$$
$$\{I(P_{NTF}) \cdot C_{NTF} + P_{repair} \cdot C_{repair} + P_{junk} \cdot C_{junk} + P_{FMA} \cdot C_{FMA}\}$$

Assume there are $n_3$ packs installed over the year before the prior year—Fiscal Year (FY) X−2 and the warranty period T=2 years. Then the warranty cost for FY X incurred from the installations in FY X−2 can be approximated by:

$$C_{w,FYX-1} \approx n_3 \cdot \frac{4.38 \times 10^{-6} \lambda}{P_{repair} + P_{junk} + P_{FMA}}$$

$$\{I(P_{NTF}) \cdot C_{NTF} + P_{repair} \cdot C_{repair} + P_{junk} \cdot C_{junk} + P_{FMA} \cdot C_{FMA}\}$$

The total warranty cost for FY X from all sources can be approximated by:

$$C \approx C_{w,FYX} + C_{w,FYX-1} + C_{w,FYX-2}$$

Scenario C—Mixed Warranty Period Lengths

If the installations from different fiscal years have different warranty period lengths, or installations from the same fiscal year but different customers have different warranty period lengths, use equation (4) for each individual situation and sum them.

Scenario D—Monthly or Quarterly Data

If the number of shipments or installed units are per months or quarters, total warranty cost computed from equation (4) may be more accurate than yearly data. For example, assume there are n packs to be installed over the July of FY X, and the warranty period=1 year. Then the warranty cost for FY X incurred from the installations in July can be approximated by:

$$C_w \approx n \cdot \frac{8.76 \times 10^{-6} \lambda \cdot F_{IMF} \cdot \frac{11}{24}}{P_{repair} + P_{junk} + P_{FMA}}$$

$$\{I(P_{NTF}) \cdot C_{NTF} + P_{repair} \cdot C_{repair} + P_{junk} \cdot C_{junk} + P_{FMA} \cdot C_{FMA}\}$$

The factor of $\frac{11}{24}$ represents an adjustment factor for the remaining portion of a warranty period that is available at a certain month. Installation of a product in July (mid-July for simple averaging purposes) results in 5.5 months of warranty time remaining of a 12 month warranty, which is mathematically equivalent to $\frac{11}{24}$. The total warranty cost can be found by summing warranty cost from each of all warranty-eligible months.

Although various embodiments that incorporate the teachings of the present invention have been shown and described in detail herein, those skilled in the art can readily devise many other varied embodiments that still incorporate these teachings.

What is claimed is:

1. A non-transitory computer program product wherein computer instructions stored on fixed or removable non-transitory media, when processed using a processor cause a computing device to perform a method of calculating a warranty cost of providing a warranty for a product, the method comprising:

assigning probability parameters utilized in evaluating the warranty cost, the probability parameters being obtained from a business' quality system include at least one of a no-trouble-found (NTF) parameter, a repaired parameter, a junked parameter, and subject to further failure mode analysis (FMA) parameter; and calculating the warranty cost as including a repair, product conformance (PC) and Dead-On-Arrival (DOA) cost and a Change Notice cost to arrive at a total warranty cost, wherein the warranty cost is calculated using at least one of said assigned probability parameters, and at least one variable characterizing a customer profile for the product.

2. The non-transitory computer program product of claim 1, wherein the at least one of said assigned probability parameters characterizing a physical condition of the product is selected from the set of probabilities consisting of $P_{NTF}$, $P_{repair}$, $P_{junk}$, and $P_{FMA}$ and the group of costs consisting of $C_{NTF}$, $C_{repair}$, $C_{junk}$, and $C_{FMA}$;

wherein $P_{NTF}$ is a probability that a returned unit of the product is indicated as no trouble found (NTF), $P_{repair}$ is a probability that a returned unit of the product is indicated as being repaired, $P_{junk}$ is a probability that a returned unit of the product is indicated as being junked, and $P_{FMA}$ is a probability that a returned unit of the product is indicated as being subject to further failure mode analysis (FMA);

wherein $C_{NTF}$ is an expected cost of a returned unit of the product that is indicated as no trouble found (NTF), $C_{repair}$ is an expected cost of a returned unit of the product that is indicated as being repaired, $C_{junk}$ is an expected cost of a returned unit of the product that is indicated as being junked, and $C_{FMA}$ is an expected cost of a returned unit of the product that is indicated as being subject to further failure mode analysis (FMA).

3. The non-transitory computer program product of claim 2, wherein the at least one variable characterizing a customer profile for the product is selected from the group of variables consisting of:

n number of units of product under warranty
T Warranty duration or warranty period length (years)
$T_0$ Trial period length before the warranty period starts (years)
$\tau_L$ warranty starting time with warranty period $[\tau_L, \tau_U]$
$\tau_U$ warranty ending time with warranty period $[\tau_L, \tau_U]$ and
β distribution factor.

4. The non-transitory computer program product of claim 1, wherein the repair, product conformance and Dead-On-Arrival cost is calculated as follows:

$$C_w(T + T_0) \approx n \cdot \frac{8.76 \times 10^{-6} \lambda \cdot I((T + T_0) \cdot F_{IMF})}{P_{repair} + P_{junk} + P_{FMA}} \cdot$$

$$\{I(P_{NTF}) \cdot C_{NTF} + P_{repair} \cdot C_{repair} + P_{junk} \cdot C_{junk} + P_{FMA} \cdot C_{FMA}\}$$

where $I(P_{NTF})$ is a no-trouble found indicator function;
$C_W$ is warranty repair and product conformance (PC/DOA) cost;
λ is a steady-state failure rate of the product;
$F_{IMF}$ is an Infant Mortality Factor;
D is an adjustment factor for PC/DOA; and $$I((T + T_0) \cdot F_{IMF}) = \begin{cases} (T + T_0) \cdot F_{IMF} + (D - 1) \cdot F_{IMF} & \forall\, 0 < T + T_0 \leq 1 \text{ year} \\ D \cdot F_{IMA} + T + T_0 - 1 & \forall\, T + T_0 \geq 1 \text{ years} \end{cases}$$

5. The non-transitory computer program product of claim 1, wherein the Change Notice cost is calculated as follows:

$$Cn = n \cdot C_s \cdot P_s \cdot F_s$$

where $C_s$ is the average CN/Seed Stock cost per unit of product;
$P_s$ is the probability that a unit will be subject to CN/Seed Stock in this specified time period, with default value of 0; and
$F_s$ is an adjustment factor with default value of 1.

6. The non-transitory computer program product of claim 1, wherein the step of calculating further comprises a first step of calculating a first type of warranty amount and entering such amount into an expression used in calculating the warranty cost.

7. The non-transitory computer program product of claim 6, wherein the step of calculating further comprises a second step of calculating a second type of warranty amount and entering such amount into an expression used in calculating the warranty cost.

8. An apparatus for performing a warranty cost calculation operation for a product, comprising:
   means for assigning probability parameters representative of a major category of a physical disposition of the product, the at least one of said assigned probability parameters comprising a no-trouble-found (NTF) parameter, a repaired parameter, a junked parameter, and subject to further failure mode analysis (FMA) parameter;
   means for performing acceptance of determined values for one or more parameters that characterize one or more corresponding physical conditions of the product;
   means for performing acceptance of determined values for one or more variables that characterize a customer profile for the product; and
   means for calculating warranty cost of providing the warranty for the product based on said assigned probability parameters and variable values including calculating a repair, product conformance (PC) and Dead-On-Arrival (DOA) cost and a Change Notice cost to arrive at a total warranty cost.

9. The apparatus claim 8, wherein the one or more assigned probability parameters is selected from the set of probabilities consisting of $P_{NTF}$, $P_{repair}$, $P_{junk}$, and $P_{FMA}$ and costs $C_{NTF}$, $C_{repair}$, $C_{junk}$, and $C_{FMA}$;
   wherein $P_{NTF}$ is a probability that a returned unit of the product is indicated as no trouble found (NTF), $P_{repair}$ is i a probability that a returned unit of the product is indicated as being repaired, $P_{junk}$ is a probability that a returned unit of the product is indicated as being junked, and $P_{FMA}$ is a probability that a returned unit of the product is indicated as being subject to further failure mode analysis (FMA);
   wherein $C_{NTF}$ is an expected cost of a returned unit of the product that is indicated as no trouble found (NTF), $C_{repair}$ is an expected cost of a returned unit of the product that is indicated as being repaired, $C_{junk}$ is an expected cost of a returned unit of the product that is indicated as being junked, and $C_{FMA}$ is an expected cost of a returned unit of the product that is indicated as being subject to further failure mode analysis (FMA).

10. The apparatus of claim 8, wherein the means for accepting determined values of the one or more assigned probability parameters that characterize one or more corresponding physical conditions of a returned product and the one or more variables that characterize a customer profile includes an input template displayed on a display device.

11. The apparatus of claim 8, wherein the means for calculating warranty cost based on said determined parameter and variable values includes a CPU, support circuits and memory of a computer.

12. The apparatus of claim 8, wherein the repair, product conformance and Dead-On-Arrival cost is calculated as follows:

$$C_w(T+T_0) \approx n \cdot \frac{8.76 \times 10^{-6} \lambda \cdot I((T+T_0) \cdot F_{IMF})}{P_{repair} + P_{junk} + P_{FMA}} \cdot$$

$$\{I(P_{NTF}) \cdot C_{NTF} + P_{repair} \cdot C_{repair} + P_{junk} \cdot C_{junk} + P_{FMA} \cdot C_{FMA}\}$$

where $I(P_{NTF})$ is a no-trouble found indicator function;
$\lambda$ is a steady-state failure rate of the product;
$F_{IMF}$ is an Infant Mortality Factor;
D is an adjustment factor for PC/DOA; and $$I((T+T_0) \cdot F_{IMF}) = \begin{cases} (T+T_0) \cdot F_{IMF} + (D-1) \cdot F_{IMF} & \forall\, 0 < T+T_0 \leq 1 \text{ year} \\ D \cdot F_{IMA} + T + T_0 - 1 & \forall\, T+T_0 \geq 1 \text{ years} \end{cases}$$

13. The apparatus of claim 8, wherein the Change Notice cost is calculated as fallows:

$$Cn = n \cdot C_s \cdot P_s \cdot F_s$$

where $C_s$ is the average CN/Seed Stock cost per unit of product;
$P_s$ is the probability that a unit will be subject to CN/Seed Stock in this specified time period, with default value of 0; and
$F_s$ is an adjustment factor with default value of 1.

14. The apparatus of claim 8, wherein warranty cost information resulting from the calculating of the warranty cost is organized in an output template displayed on a display device.

* * * * *